United States Patent [19]
Kamatakis et al.

[11] Patent Number: 6,101,476
[45] Date of Patent: Aug. 8, 2000

[54] CD-ROM SOFTWARE PROTECTION SYSTEM

[76] Inventors: John Kamatakis; Petros Skalkos, both of 34 Alex. Papanastasiou St., Thessaloniki 546 39; Nikolas Kamatakis, 14 Serron St, Thessaloniki 544 54, all of Greece

[21] Appl. No.: 08/836,781
[22] PCT Filed: May 28, 1996
[86] PCT No.: PCT/GR96/00013
 § 371 Date: Jul. 21, 1997
 § 102(e) Date: Jul. 21, 1997
[87] PCT Pub. No.: WO97/15051
 PCT Pub. Date: Apr. 24, 1997
[51] Int. Cl.$^7$ .................................................. G06F 17/60
[52] U.S. Cl. ........................ 705/1; 380/4; 380/5; 369/47; 369/48; 369/58
[58] Field of Search .............................. 380/4, 5; 369/47, 369/48; 705/1

[56] References Cited
U.S. PATENT DOCUMENTS 5,881,038  4/1995  Oshima et al. ............................ 369/59

Primary Examiner—James P. Trammell
Assistant Examiner—Mussie Tesfamariam
Attorney, Agent, or Firm—Sherman D. Pernia

[57] ABSTRACT

This Protection System, for PC Software stored in CD-ROM, prevents the illegal copying (hacking) with negligible cost increase of the protected Application. The same CD-ROM that contains the Application Software serves as a "protection key". The CD-ROM disk undergoes a special treatment during its production phase that results in the generation of the Inspection Ring. This system uses a special method for the verification of the authenticity of the Inspection Ring. The existence of the Inspection Ring along with the use of the authenticity verification procedure make impossible the copying of the CD-ROM disk even with the most advanced recording equipment. This system has many advantages over other protection methods like: excellent protection, transparency to the end-user and very low cost since the "protection-key" is the same CD-ROM disk that contains the Application. This system can be used for the protection of every Application Software for PC compatibles that is stored in a CD-ROM and runs under DOS or Windows environments.

11 Claims, 1 Drawing Sheet

CD-ROM SOFTWARE PROTECTION SYSTEM

TECHNICAL DESCRIPTION

1. Introduction

This system is used for the protection of CD-ROM software (for PC compatible computers) from illegal copying. This method can be used for CD disks of any size and any CD-ROM format. This system prevents the illegal copying of the PC software using as a "protection key" a specially processed CD-ROM. A very high degree of software protection is provided due to the fact that this specific CD-ROM can not be copied and due to the existence of an advanced method for the verification of the CD-ROM authenticity.

This system consists of two parts:

a) The specially manufactured or processed CD-ROM b) The System Software that verifies the CD-ROM authenticity

DEVELOPMENT OF THE SOFTWARE PROTECTION SYSTEM

Figure 1:
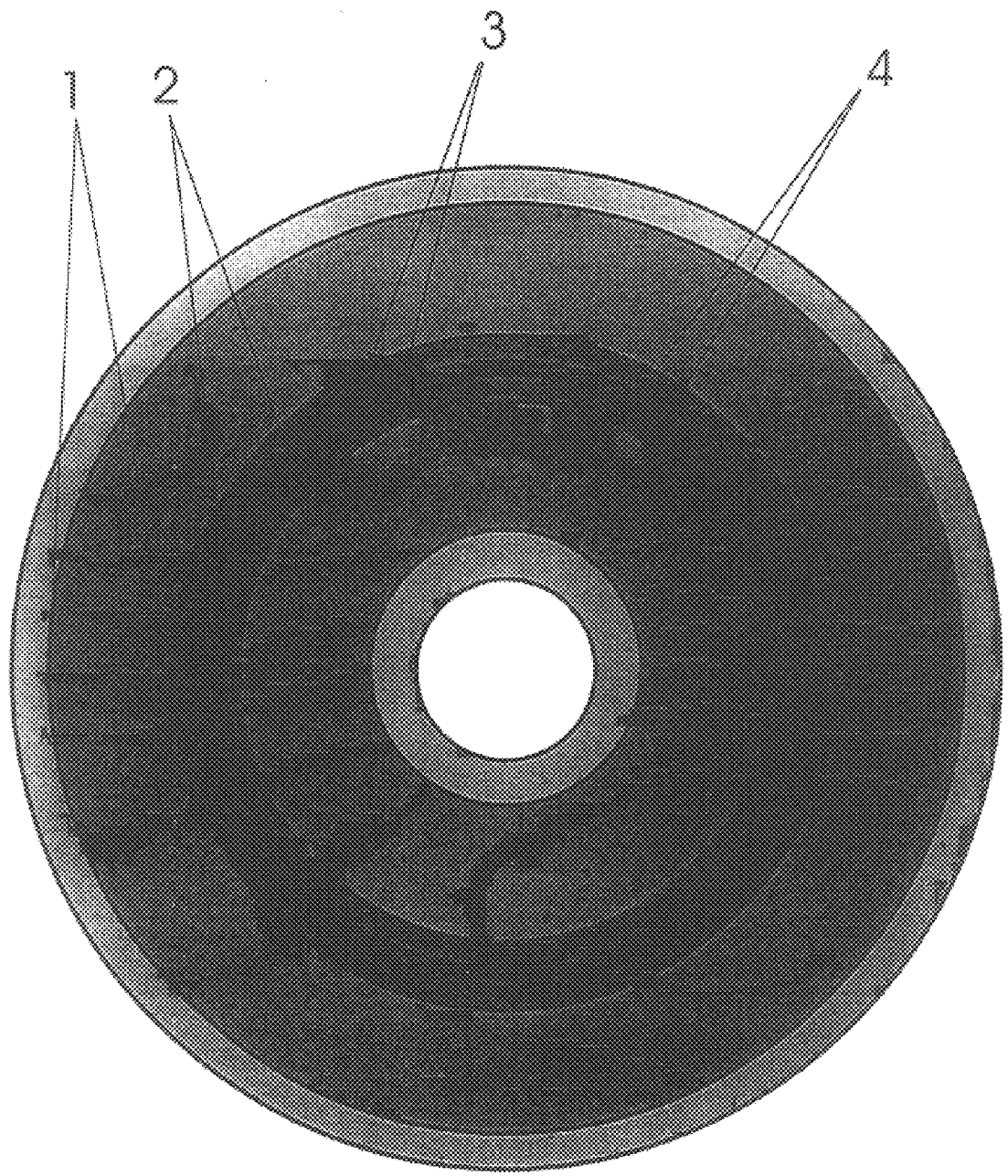
FIG. 1 is a top view diagram of an optical disk of the present invention showing a series of homocentric ring areas, the ring areas being an application code area followed by at least one protection ring in alternating succession with another application code area, with the inner most and outer most rings being application code areas.

2.1 Modification of the Protected Application Software

The protected Application Software (hereafter referred as Application Code) combines with the special Protection Software (hereafter referred as Protection Code) to form a new Composite Application Code. The Protection Code is placed before the Application Code in order to carry out the initial checks for the verification of the CD-ROM authenticity prior to the execution of the Application Code.

The integration of the Protection Code into the Application Code can be carried out in either the form of objective code or in the form of executable code.

2.2 Glass Master Production

The Composite Application Code that resulted from the procedure defined in paragraph 2.1 together with the rest of the Application files are copied on the Glass Master with the use of special CAD/CAM tools that control this process. Special attention is given to the spatial distribution of the software on the Glass Master. As seen in FIG. 1 that shows this special Glass Master, a specific ring (3) with width of a few mm is reserved, so that the central region (4) is mechanically processed during a following step, while the adjacent areas on either sides contain the Protection Code and special Encrypted Data that are checked by the Protection Code. This area will be referred hereafter as Protection Ring (3). The Application Code and the Data are stored in the areas (1) & (2) of the Glass Master. The inspection ring (4) included in a protection ring (3) comprises permanent destruction of the optical properties of one or more specific ring areas in the middle of the inspection ring of the Glass Master which is achieved with the use of mastering equipment that creates a continuous spiral track that has the form of a continuous pit.

2.3 Mechanical Processing of the Glass Master

During this phase, the Glass Master undergoes a special mechanical treatment with the use of special equipment that is used for the Glass Master manufacturing. Thus, a homocentric ring (4) of 10 μm width is produced within the central part of the Protection Ring. This ring marks the specific region and is checked by the Protection Code for the verification of the authenticity of the CD-ROM disk and will be referred hereafter as Inspection Ring (4). The polar coordinates of the Inspection Ring are very critical for the verification of the authenticity of the CD-ROM. These parameters are included in the Data of the Protection Code since the polar coordinates of the Inspection Ring are predetermined.

This very special treatment can only be carried out with the use of special CAD/CAM package that controls the Glass Master production machine. The Inspection Ring (4) is seen in FIG. 1 that shows the special Glass Master that contains the Software Protection System. The Composite Application Code with the Data are stored in adjacent areas (1) & (2) to the Protection Ring (3) on both sides. The Inspection Ring (4) is located in the middle of the Protection Ring (3). The Glass Master (FIG. 1) is used subsequently for the production of the CD-ROM disks with special machines (stampers). Although this special processing refers to the CD-ROM Glass Master, it can be applied to any type of Optical Disk regardless of size and format, including DVD ROM format.

THE OPERATION OF THE SOFTWARE PROTECTION SYSTEM

3.1 The Protection Code

The Protection Code is written in Assembly language for Intel 80×86 microprocessors and was developed with the use of the Borland Turbo Assembler. The Microsoft Linker was also used for the linking process. The Protection Code is combined with the Application Code in either objective or executable form.

3.2 The Functional Operation of the Protection System

The Software Protection System requires the presence of the original CD-ROM disk in the CD player independent of whether the Application was copied on the hard disk or is executed from the CD disk. During the execution of the Application, initially the Protection Code is executed, inspects the CD-ROM Protection Ring and decodes the polar coordinates of the Inspection Ring. Then it checks that the Inspection Ring is at the predefined position thus verifying the authenticity of the CD-ROM. If the CD-ROM is not the original one, then the execution is terminated and the user receives a relative message. Special attention is given during the Software development phase, so that the verification process does not conflict with the operation of the CD-ROM device driver. The protection code's execution is transparent to the user and has an autonomous operation that does not need a special key-code to be provided by an authorized dealer of the Application software to be protected.

Only after the authenticity of the CD-ROM is verified, the execution of the application is allowed in either a DOS or Windows environment. In a case that the original CD-ROM is absent, the Application execution does not commence, while at the same time a relative message on the user screen appears.

This system can achieve a very high degree of protection because it is impossible to copy the original CD-ROM. This is due to the existence of the Inspection Ring on the CD-ROM disk. The most common ways of illegal copying of CD-ROMs are:

a) CD-ROM copying with CDR (CD Recordable) equipment
b) Glass Master copying & reproduction
c) Application copying on the hard disk
d) Protection Code "cracking" with the use of Software or Hardware Debugger Cases (a), (b) & (c) are prevented with the help of the Inspection Ring that as a destroyed area makes every possible recording procedure to fail. Case (d) is prevented thanks to the unique integration of the authenticity verification procedure into the Application software in a way that can not be cracked by experienced programmers and hackers. In particular, the Protection Code prevents the introduction of Breakpoints with the use of Software & hardware Debugger, thus making it impossible to crack the protected software.

We claim:

1. A method for protecting an optical disk based application software from illegal copying by use of a specially processed optical disk comprising the step of:

manufacturing a Glass Master;

treating the Glass Master with a Glass Master production machine to produce application code areas and a protection ring having an inspection ring within a central part of the protection ring, the inspection ring having predefined position parameters including polar coordinates;

storing a composite application code including the inspection ring's predefined position parameters on the Glass Master in the application code area and protection ring, the composite application code comprising application software and protection code;

producing a specially processed optical disk from the Glass Master;

checking the position parameters of the inspection ring during use of the specially processed disk;

inspecting the predefined position parameters stored in the protection ring and verifying whether the measured location parameters agree with the stored location parameters in a process that is transparent to a user; and protecting the optical disk based software application from being illegally copied by terminating execution of the application software if the measured location parameters and the stored location parameters do not agree.

2. The method of claim 1 wherein the producing step comprises:

producing a specially processed optical disk through a fabrication process in a successive order from the Glass Master to a Father Stamper optical disk to a Mother Stamper optical disc, to a Production Stamper optical disk, and to the specially processed optical disk that is distributed in the market.

3. The method of claim 1 wherein the storing step comprises:

storing a composite application code including the inspection ring's predefined location parameters on the Glass Master in the application and protection rings, the predefined location parameters including position, polar coordinates and width.

4. The method of claim 1, wherein the comparing step is carried out prior to the execution of the software application, thus not requiring the further presence of the specially processed optical disk for verification purposes.

5. The method of claim 1, wherein the comparing step is transparent to a user and does not need provision of a special key-code to protect the optical disk based software application from illegal copying.

6. A Glass Master for producing optical disk based software applications protected from illegal copying on a specially processed optical disk, the Glass Master comprising:

a series of homocentric ring areas, the ring areas being an application code area followed by at least one protection ring in alternating succession with another application code area, with the innermost and outermost rings being application code areas;

an application code area containing a composite application code and data, including the software application and a protection code;

a protection ring being an area of the Glass Master at a specific position, specially treated to provide at least one homocentric ring area that is reserved for storage of composite application code including the protection code and encrypted data, and to provide an inspection ring;

a composite application code which functions to protect the software application from illegal copying, which function is transparent to a user;

an inspection ring provided within the protection ring, the inspection ring formed by the permanent destruction of the optical properties of one or more specific ring areas in the middle of the protection ring to form a continuous spiral track that has the form of a continuous pit, and having predefined position parameters; and encrypted data stored in the areas of the protection ring that are adjacent to the inspection ring, which data include the predefined location parameters of the inspection ring and information about the protected application software.

7. The Glass Master of claim 6 wherein the protection ring contains code that can be accessed only by special software methods.

8. The Glass Master of claim 6, wherein the composite application code of the protection ring causes an operating system to issue a specific error code message on any attempt to access the composite application code.

9. The Glass Master of claim 6, wherein the inspection ring has predefined position parameters including polar coordinates and width.

10. The Glass Master of claim 6, wherein the composite application code comprises an algorithm of the protection code placed in the beginning of the software application thus forming a part of the composite application code that is distributed into the application Rings.

11. The Glass Master of claim 6, wherein the encrypted data stored in the protection ring which indicate the predefined location parameters of the inspection ring are also contained in the protection code that is part of the composite application code.

* * * * *